(12) United States Patent
Cho

(10) Patent No.: US 8,261,699 B2
(45) Date of Patent: Sep. 11, 2012

(54) NON-CHOKING HARNESS FOR PET

(75) Inventor: Hyeon I. Cho, Allendale, NJ (US)

(73) Assignee: Puppia International Inc., Little Ferry, NJ (US)

( * ) Notice: Subject to any disclaimer, the term of this patent is extended or adjusted under 35 U.S.C. 154(b) by 0 days.

(21) Appl. No.: 13/437,150

(22) Filed: Apr. 2, 2012

(65) Prior Publication Data

US 2012/0192809 A1 Aug. 2, 2012

Related U.S. Application Data

(62) Division of application No. 12/764,538, filed on Apr. 21, 2010, now Pat. No. 8,166,924.

(60) Provisional application No. 61/171,257, filed on Apr. 21, 2009.

(51) Int. Cl.
*A01K 27/00* (2006.01)
*A01K 15/02* (2006.01)

(52) U.S. Cl. .......................... 119/856; 119/792; 119/907

(58) Field of Classification Search .................. 119/792, 119/793, 856, 907
See application file for complete search history.

(56) References Cited

U.S. PATENT DOCUMENTS

| | | | |
|---|---|---|---|
| 5,503,894 A * | 4/1996 | Brown | 428/128 |
| 5,511,515 A * | 4/1996 | Brown et al. | 119/771 |
| 5,913,285 A | 6/1999 | Pritchard | |
| 6,571,745 B2 | 6/2003 | Kerrigan | |
| 6,662,755 B2 | 12/2003 | Kato | |
| 6,694,923 B1 | 2/2004 | Fouche | |
| 6,827,044 B2 | 12/2004 | Lobanoff et al. | |
| 6,936,269 B2 * | 8/2005 | Robinson | 424/409 |
| 7,004,922 B1 | 2/2006 | Shesol | |
| 7,284,504 B1 * | 10/2007 | Purschwitz et al. | 119/792 |
| 2004/0025804 A1 * | 2/2004 | Smith et al. | 119/792 |
| 2006/0037562 A1 * | 2/2006 | Woerner | 119/856 |
| 2006/0054109 A1 * | 3/2006 | Smith | 119/856 |
| 2006/0112903 A1 * | 6/2006 | Zutis et al. | 119/792 |
| 2006/0156997 A1 | 7/2006 | Moore | |
| 2007/0044735 A1 | 3/2007 | Zimmerman | |
| 2008/0047501 A1 * | 2/2008 | Madere et al. | 119/863 |
| 2010/0122667 A1 * | 5/2010 | Horgan | 119/792 |
| 2011/0067648 A1 * | 3/2011 | Siklosi et al. | 119/792 |
| 2011/0174237 A1 * | 7/2011 | Sanders-Luckman et al. | 119/792 |
| 2011/0271913 A1 * | 11/2011 | Min | 119/856 |

* cited by examiner

*Primary Examiner* — Rob Swiatek
*Assistant Examiner* — Kathleen Iwasaki
(74) *Attorney, Agent, or Firm* — Im IP Law PLLC; C. Andrew Im

(57) ABSTRACT

A non-choking harness for a pet which evenly distributes stress throughout the chest area and away from the neck area of the pet when the leash is pulled to prevent choking. A center portion of the body part substantially covers the chest area of the pet. The two neck ends are configured to wrap around a neck of the pet and the two torso ends are configured to wrap around a torso of the pet. The adjustable strap removably connects a first torso end to a second torso end, and adjusts the size of the torso opening to provide a comfortable fit. The connection part is configured to removably connect to the two neck ends, removably connect to the adjustable strap; and to adjust the size of the neck opening. The non-choking harness completely opens up for easy access in fitting the pet.

9 Claims, 14 Drawing Sheets

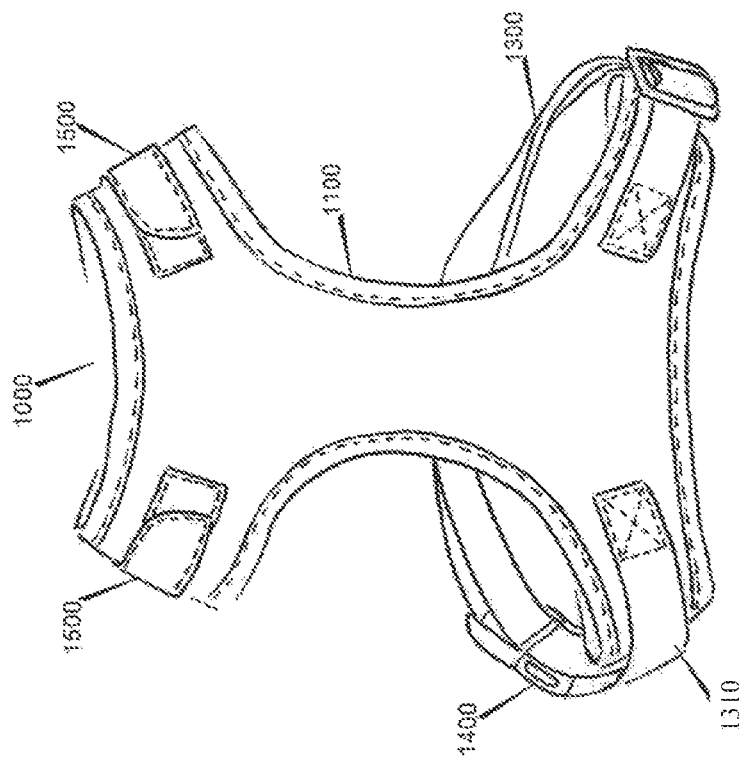
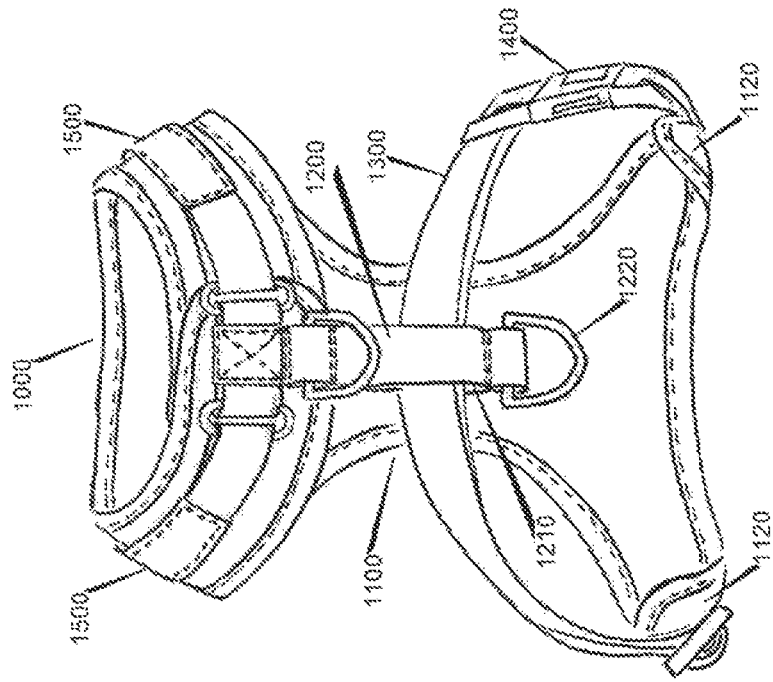
FIG. 10B
FIG. 10A

NON-CHOKING HARNESS FOR PET

RELATED APPLICATION

The present application is divisional of application Ser. No. 12/764,538 filed Apr. 21, 2010, now U.S. Pat. No. 8,166,924 which claims priority to U.S. Provisional Patent Application No. 61/171,257, filed on Apr. 21, 2009, each of which is incorporated herein in its entirety.

FIELD OF THE INVENTION

The claimed invention relates to a harness for a pet, and more particularly to a non-choking harness for a pet.

BACKGROUND OF INVENTION

A collar or harness wound on a neck of a pet has been conventionally used for connecting a leash to a pet. As shown in FIGS. 1 and 2, a conventional harness 100 generally includes a collar band 110 wound on a neck of a pet 200, a torso band 120 mounted generally on a torso region of the pet 200 positioned between forelegs 210 and hind legs 220 of the pet 200, a first connection band 130 for connecting the collar band 110 and the torso band 120 to each other on a dorsal or back side of the pet 200, and a second connection band 140 for connecting the collar band 110 and the torso band 120 to each other on a ventral side of the pet 200. Typically the harness 100 is constructed so as to permit a leash 150 to be connected to the first connection band 130.

In the conventional harness 100, each of the collar band 110, the torso band 120 and the first and connection bands 130, 140 are generally uniform in width and typically made of a nylon, synthetic or natural leather. U.S. Pat. No. 6,662,755 describes a conventional harness with a moveable lead connecting ring to prevent reversal and torsion of the collar and trunk bands of the harness. Not only these conventional harnesses are uncomfortable for the pet, but these conventional harnesses, particularly the collar band, can choke or put an enormous stress on the pet's neck when the leash is pulled by the animal handler or when the pet dashes forward. Therefore, it is desirable to have a choke-free or non-choking harness that is comfortable and evenly distributes the stress throughout the chest area of the pet when the leash is pulled, thereby minimizing or eliminating any choking hazard on the pet's neck.

SUMMARY OF THE INVENTION

Therefore, it is an object of the claimed invention to solve the aforesaid problems with the prior art.

Another object of the claimed invention is to provide a non-choking harness.

A further object of the claimed invention is to provide the non-choking harness as aforesaid which completely opens up to provide easy access in fitting the pet.

In accordance with an exemplary embodiment of the claimed invention, a non-choking harness for a pet which evenly distributes stress throughout the chest area and away from the neck area of the pet when the leash is pulled to prevent choking. The non-choking harness comprises a body part, an adjustable strap, and a connection part. The body part comprises a center portion which substantially covers the chest area of the pet, two neck ends configured to wrap around a neck of the pet to provide a neck opening and two torso ends configured to wrap around a torso of the pet to provide a torso opening. The adjustable strap removably connects a first torso end to a second torso end, and adjusts the size of the torso opening to provide a comfortable fit. The connection part is configured to removably connect to the two neck ends, removably connect to the adjustable strap; and to adjust the size of the neck opening. At least one D-ring for attaching a leash is fixedly attached to the connection part. Preferably, the D-ring is fixedly attached to retain pendular motion but inhibit sliding movements. The non-choking harness completely opens up for easy access in fitting the pet.

In accordance with an exemplary embodiment of the claimed invention, the connection part comprises a folded strap forming a loop to receive the adjustable strap. The adjustable strap is moveable along the loop to provide a tight fit when worn by the pet.

In accordance with an exemplary embodiment of the claimed invention, the non-choking harness further comprises a pair of mated connectors. The first mated connector is fixedly attached to the second torso end of the body part. The second mated connector is fixedly attached to one end of the adjustable strap. The other end of the adjustable strap is fixedly attached to the first torso end of the body part.

In accordance with an exemplary embodiment of the claimed invention, the harness further comprises a Velcro® hook and loop strap at each neck end of the body part. The connection part comprises two flatten oval rings. The Velcro® hook and loop strap comprises a fuzzy side and a rough side. The Velcro® strap loops around a respective flatten oval ring such that the fuzzy side of the Velcro® strap mates with the rough side of the Velcro strap to removably connect a respective neck end to the connection part.

In accordance with an exemplary embodiment of the claimed invention, the body part of the harness is made of sturdy, elastic mesh-like polyester material to provide lightweight, breathable and comfortable harness. Preferably, the mesh-like polyester material comprises an outer layer, an inner layer and an internal layer between the outer and inner layers. In accordance with an aspect of the claimed invention, the internal layer is infused with one or more of the following fragrances: relaxing aroma, therapeutic aroma, cologne, perfume and flea protection agent.

In accordance with an exemplary embodiment of the claimed invention, the harness comprises a pouch on an inner surface of the chest portion of body part to receive a cool pack to cool the pet or a hot pack to warm the pet. In accordance with an aspect of the claimed invention, the pack is infused with one or more of the following fragrances: relaxing aroma, therapeutic aroma, cologne, perfume and flea protection agent.

In accordance with an exemplary embodiment of the claimed invention, the connection part comprises an arc shaped flap. Two pairs of mated connectors are provided in the harness to removably connect the arc shaped flap to two neck ends of the body part. Two first mated connectors is attached to outer surfaces of respective neck ends of the body part. Two second mated connectors is fixedly attached to outer surfaces of respective ends of the arc shaped flap. Each second mated connector removably mates with the first mated connector on the respective neck end of the body part to removably connect the neck ends of the body part to the connection part.

In accordance with an exemplary embodiment of the claimed invention, the harness further comprises two adjustable neck straps to adjust the size of the neck opening. One end of each adjustable neck strap is fixedly attached to a respective neck end of the body part. The other end of each adjustable neck strap is attached to a respective first mated connector.

In accordance with an exemplary embodiment of the claimed invention, an inner surface of each neck end of the body part has one of fuzzy or rough side of a Velcro® pad. The inner surface of the respective ends of the arc shaped flap has other of fuzzy or rough side of the Velcro® pad. The Velcro® pad of each neck end of the body part mates with the Velcro pad of respective end of the arc shaped flap to removably connect the body part to the connection part.

In accordance with an exemplary embodiment of the claimed invention, the harness further comprises two pairs of mated torso connectors to removably connect the connection part to the two torso ends of the body part. The two pairs of mated neck connectors removably connects the connection part to the two neck ends of the body part. The adjustable strap comprises two adjustable torso straps to connect the first torso end to the second torso end through the connection part. One end of each adjustable torso strap is fixedly attached to a respective torso end of the body part. The other end of each adjustable torso strap is attached to a respective first mated torso connector. Two second mated torso connectors are fixedly attached to opposite side ends and towards a bottom end of the connection part. Each second mated torso connector removably mates with the first mated torso connector on the respective torso ends of the body part to removably connect the torso ends of the body part to the connection part. Two second mated neck connectors are fixedly attached to opposite side ends and towards a top end of the connection part. Each second mated neck connector removably mates with the first mated neck connectors on the respective neck ends of the body part to removably connect the neck ends of the body part to the connection part. Preferably, the connection part is an oval shaped connector.

Various other objects, advantages and features of the claimed invention will become readily apparent from the ensuing detailed description, and the novel features will be particularly pointed out in the appended claims.

BRIEF DESCRIPTION OF THE DRAWINGS

These and other advantages of the claimed invention will be described in detail with reference to the following drawings in which like reference numbers refer to like elements:

FIGS. 10A-B are front and back perspective views of the non-choking harness of FIGS. 3-4 in a closed position in accordance with an exemplary embodiment of the claimed invention;

DETAILED DESCRIPTION OF THE EMBODIMENTS

The harness is generally favored by the pet owner over the collar fitted a pet's neck because it is easier to control the pet with the harness and it is harder to remove the harness for the pet. The harness enables the pet owner to concurrently pull the neck and trunk of the pet by pulling on the leash connected to the harness.

Turning now to FIGS. 3, 5A-B and 10A-B, there is illustrated a non-choking harness 1000 in accordance with an exemplary embodiment of the claimed invention, which comprises a body part 1100 and a connection part 1200. The body part 1100 is shaped as a stylized letter K rotated 90° with a center portion 1130 to cover substantially or entirely the chest area of the pet 200, two neck ends 1110 and two torso ends 1120. Preferably, the neck end 1110 is longer than the torso end 1120. The two neck ends 1110 of the body part 1100 wrap around the neck of the pet 200, as exemplary shown in FIG. 6. The two torso ends 1120 of the body part 1100 wrap around the torso of the pet 200, as exemplary shown in FIG. 6.

Figure 9:
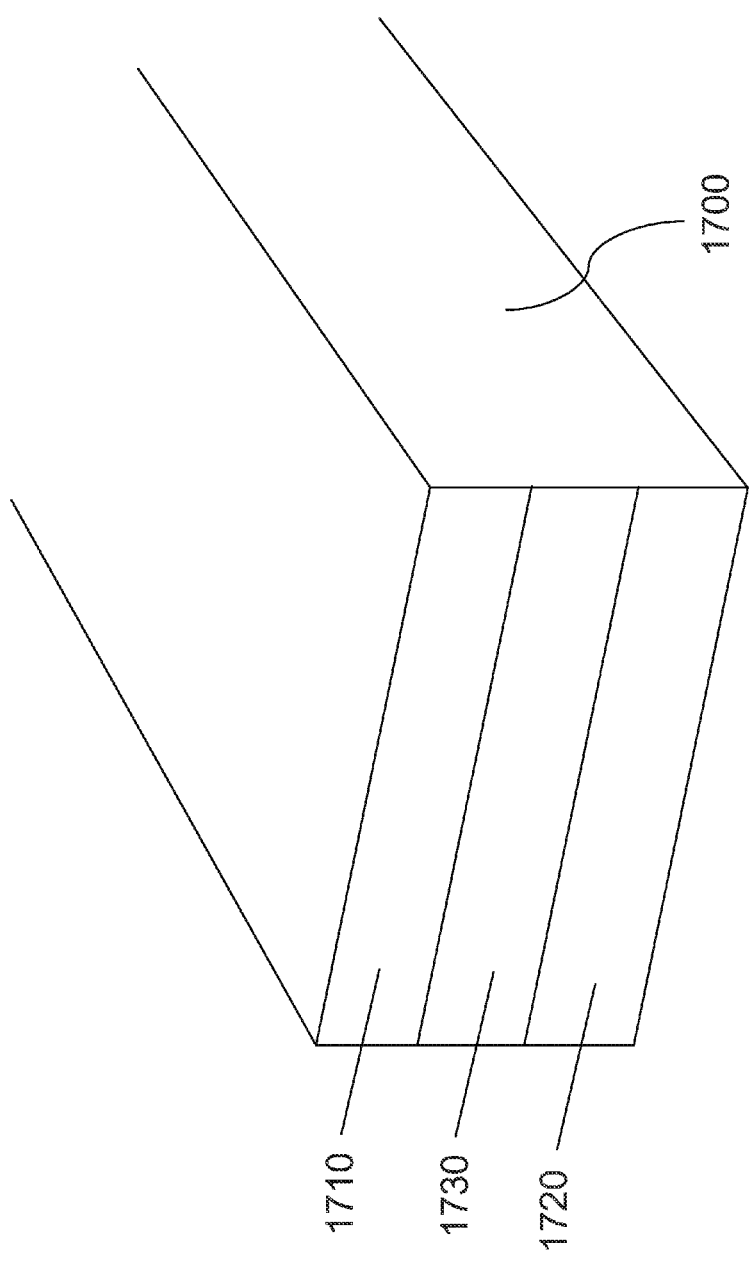
FIG. 9 is a cut-out view of various layers of non-choking harness in accordance with an exemplary embodiment of the claimed invention.

In accordance with an exemplary embodiment of the claimed invention, the harness 1000 is made of sturdy material having sufficient elasticity to provide comfort and stretchability to enable the pet owners to keep their pets in control (especially for pets that tend to pull) while the harness 1000 maintains or retains its original form. That is, the elastic property of the material retains original form of the harness 1000 even it is being pulled by the pet. In accordance with an aspect of the claimed invention, the harness 1000 is made of a mesh-like material 1700 to provide for air-flow circulation to keep the pet 200 cool during hot weather. For example, the mesh-like material 1700 can be made of 100% polyester that is soft to the touch, lightweight, breathable and comfortable. Preferably, the harness 1000 is constructed of multi-layers of material. As exemplary shown in FIG. 9, the harness 1000 is constructed of three layers of material: an outer layer 1710, an inner layer 1720, and an internal layer or internal soft sponge-like cushion 1730 between the outer layer 1710 and inner layer 1720.

In accordance with an exemplary embodiment of the claimed invention, the internal layer 1730 can be infused with various fragrances, such as relaxing aromas, therapeutic aromas, colognes, perfumes, flea protection agents and the like. Preferably, the internal layer 1730 is bonded to the outer layer 1710 on one side and the internal layer 1720 on the other to prevent any shifting of the internal layer 1730.

In accordance with an exemplary embodiment of the claimed invention, the body part 1100 of the claimed harness 1000 is designed to cover the entire or most of the chest area of the pet to divert the stress caused by the leash being pulled by the pet owner (or when the pet pulls on the leash) away from the pet's neck area. The claimed harness 1000 evenly distributes such stress throughout the pet's chest and shoulder area, thereby eliminating or minimizing any potential choking when the leash is pulled by either the pet or pet owner. In a conventional harness, when the leash is pulled, the stress is placed directly on the pet's neck, thereby potentially choking the pet.

Figure 1:
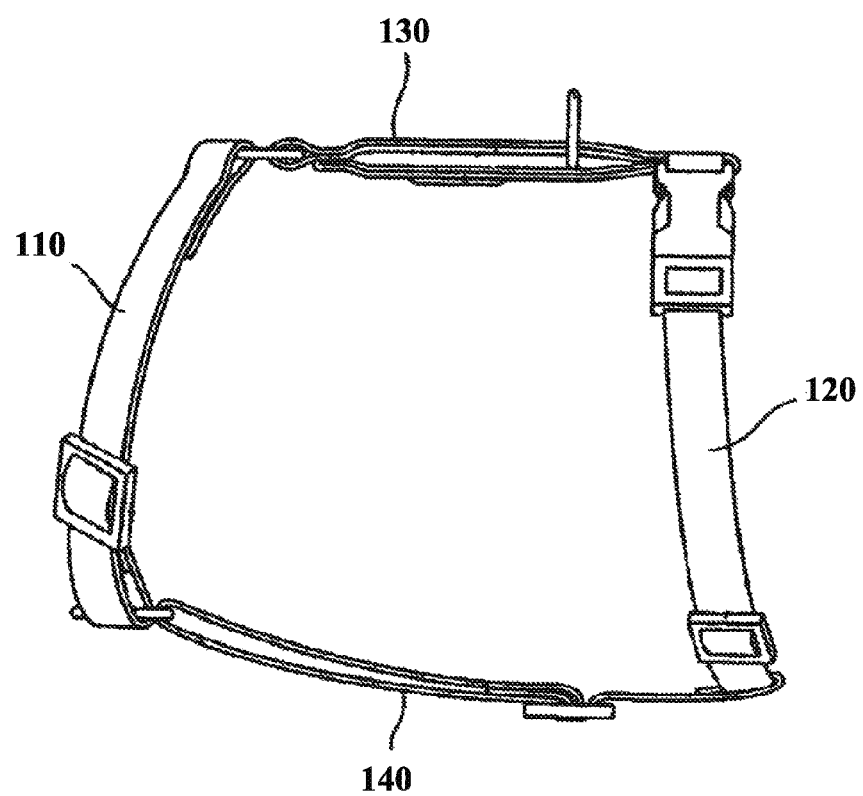
FIG. 1 is a side perspective view of a conventional harness.
Figure 2:
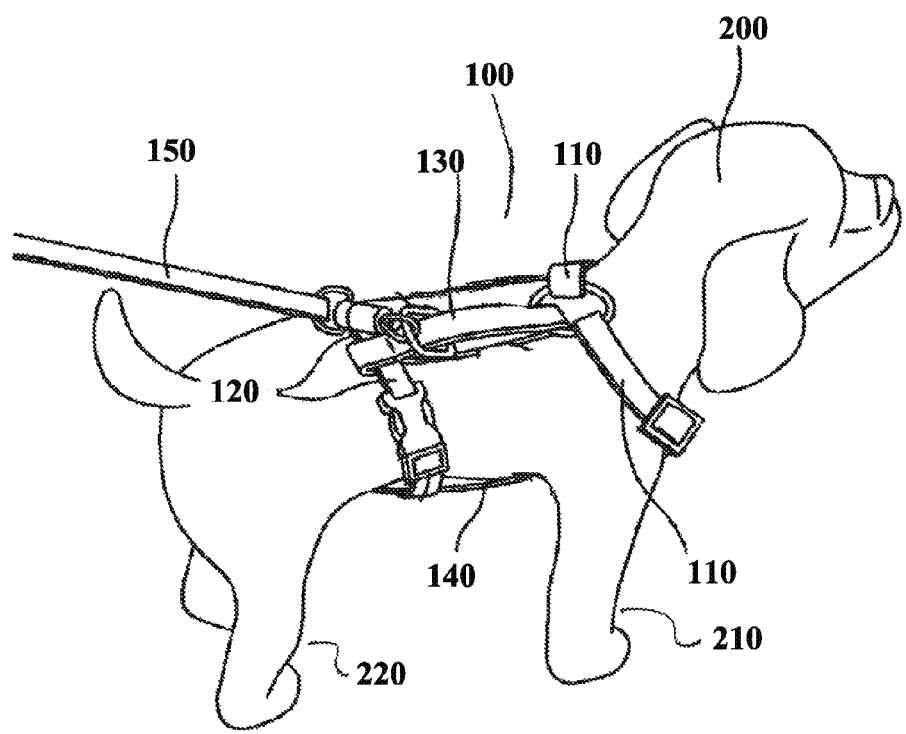
FIG. 2 is a schematic view of the conventional harness of FIG. 1 fitted on a dog.
Figure 3:
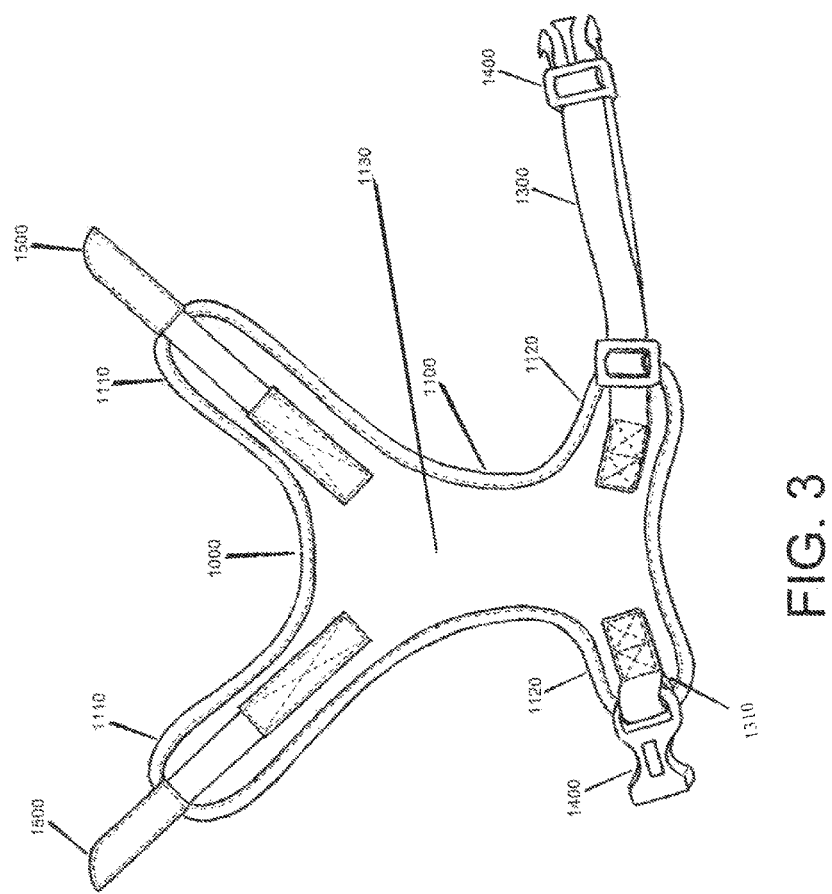
FIGS. 3-4 are top and bottom perspective views of a non-choking harness in an open position in accordance with an exemplary embodiment of the claimed invention.
Figure 4:
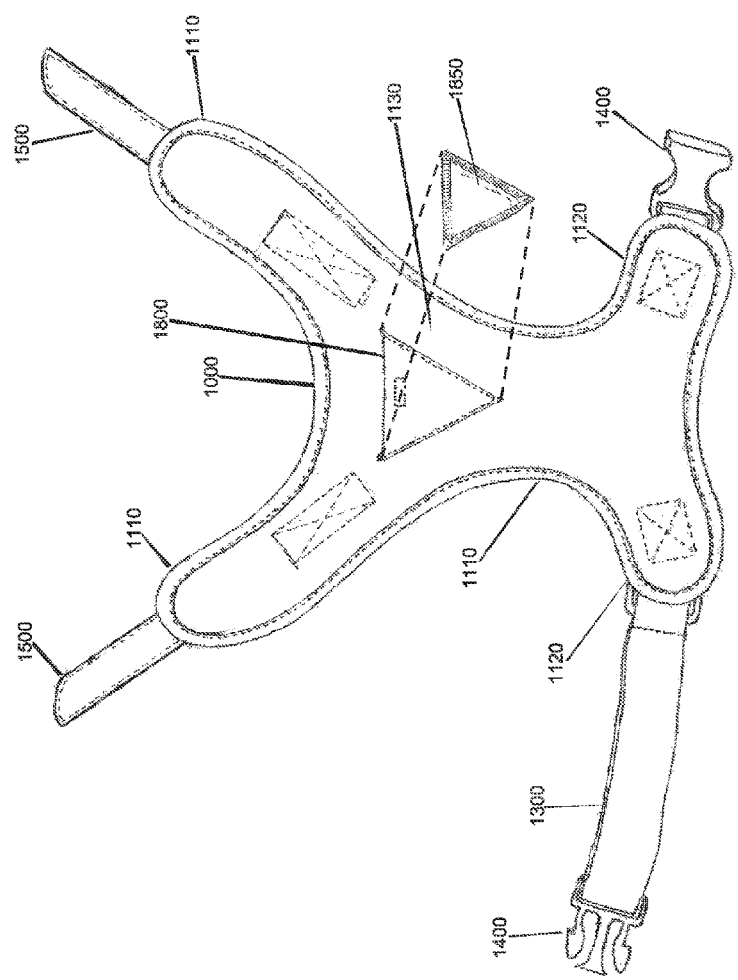

In accordance with an exemplary embodiment of the claimed invention, as exemplary shown in FIGS. 3 and 4, a first torso end 1120 is connected to an adjustable strap 1300, preferably made of a durable material including but not limited to nylon. One end of the adjustable strap 1300 is preferably stitched onto one of the torso ends 1120. In accordance with an aspect of the claimed invention, the body part 1100 further comprises a pair of mated (male-female) connectors 1400 to removably connect the other end of the adjustable strap 1300 to the second torso end 1120. Preferably, one of the mated connector 1400 is connected to the second torso end using a strap 1310 stitched onto the second torso end 1120, preferably the strap 1310 is made of a durable material, including but not limited to nylon.

Figure 5:
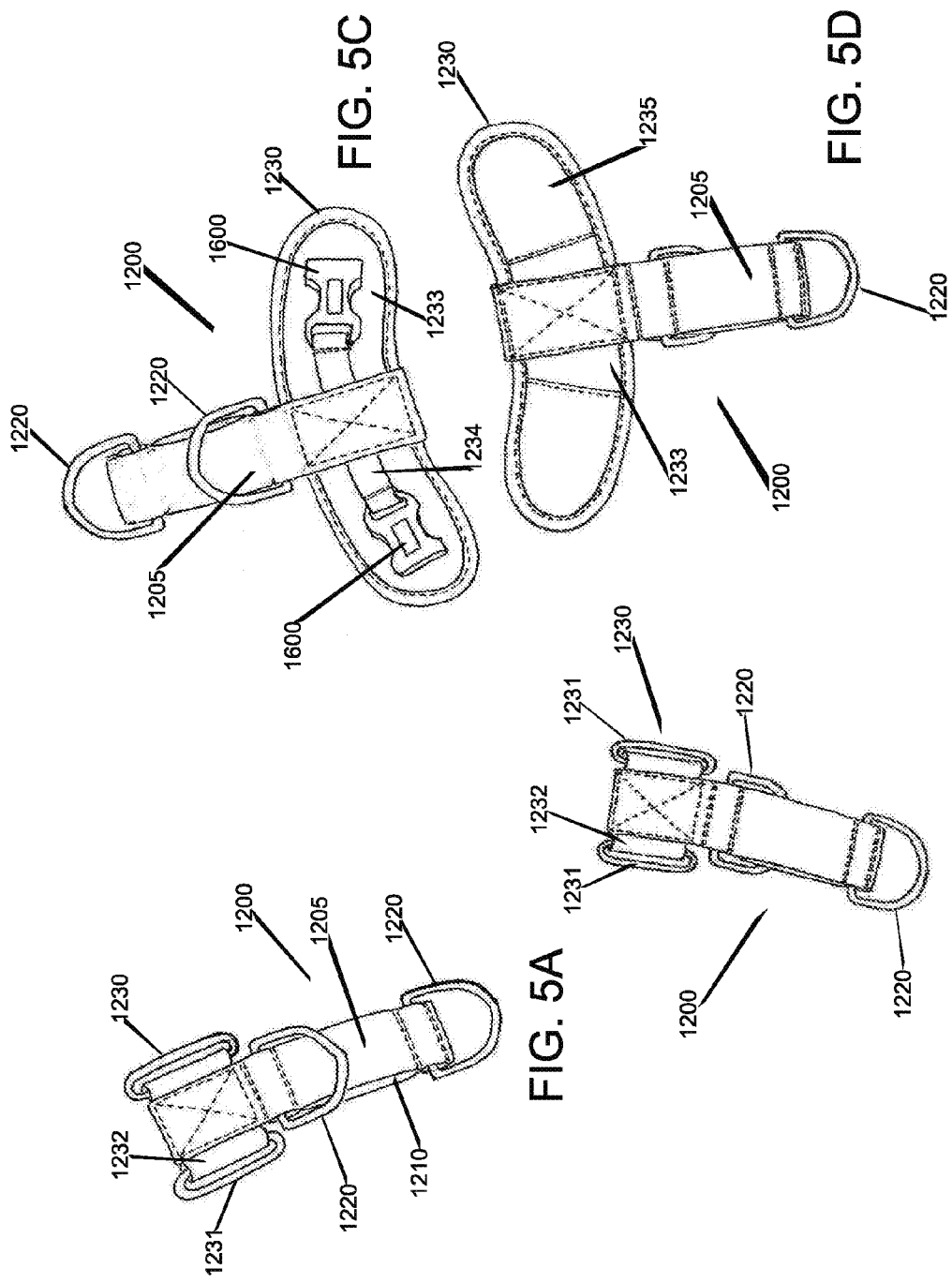
FIGS. 5A-B are top and bottom perspective views of the connection part of the non-choking harness of FIG. 3 in accordance with an exemplary embodiment of the claimed invention.
FIGS. 5C-D are top and bottom perspective views of the connection part of the non-choking harness in accordance with an exemplary embodiment of the claimed invention.
Figure 6:
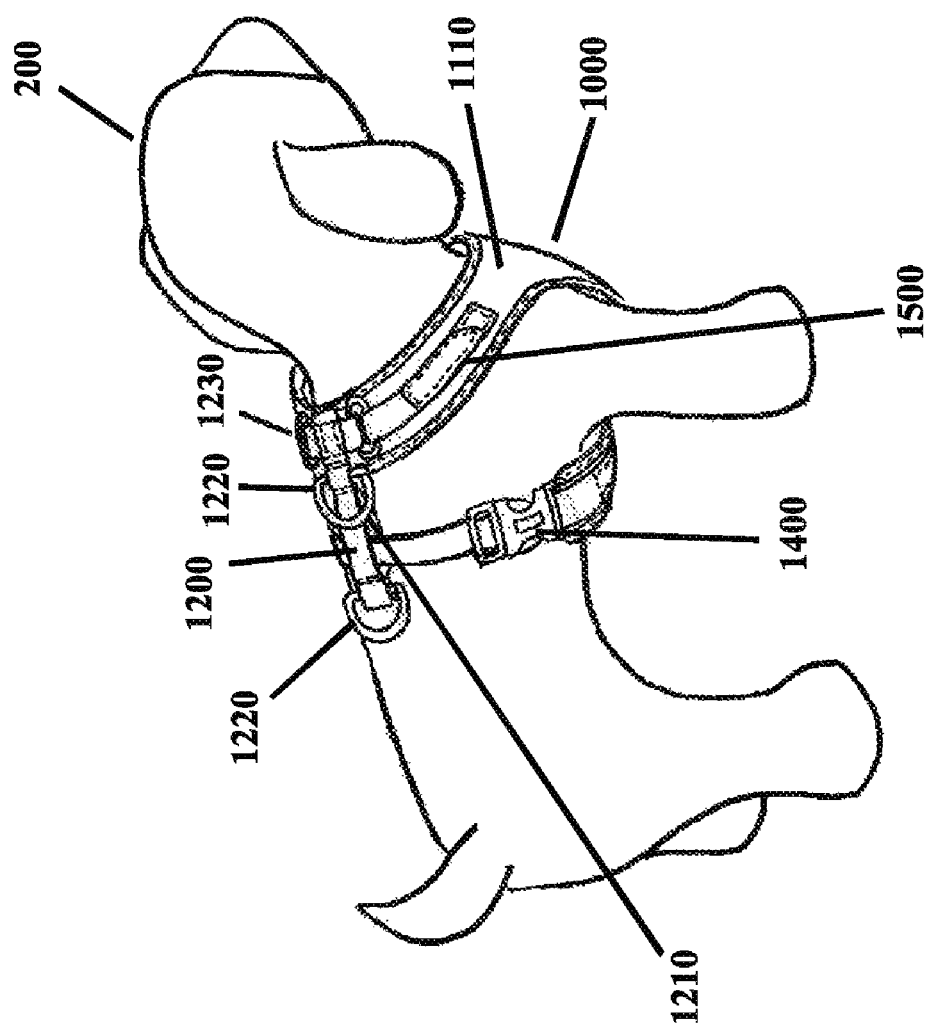
FIG. 6 is a schematic view showing a fitting of the non-choking harness of FIG. 3 on a dog in accordance with an exemplary embodiment of the claimed invention.

In accordance with an exemplary embodiment of the claimed invention, as shown in FIGS. 5A-B and 10A, the connection part 1200 comprises one or more (preferably two) D-rings 1220, which can plastic, metal and the like, for attaching a leash (not shown). The connection part 1200 is removably connected to the adjustable strap 1300. In accordance with an aspect of the claimed invention, the connection part 1200 is a strap 1205 made of durable material, including but not limited to nylon. Preferably, the strap 1205 is folded to form a loop 1210 such that the adjustable strap 1300 can be inserted into the loop 1210 of the strap 1205. The adjustable strap 1300 is moveable along the loop 1210 of the strap 1205, thereby enabling the pet owner to adjust the placement of the connection part 1200 on the back side of the pet to provide a comfortable fit for the pet. Also, the adjustable strap 1300 can be lengthen or shorten to account depending on the size of the pet. In accordance with an aspect of the claimed invention, one D-ring 1220 is fixedly attached at one end of the loop 1210 of the strap 1205 and another D-ring 1220 is fixedly attached to the other end of the loop 1210 of the strap 1205. Preferably, the folded strap 1205 loops around the D-rings 1220, and the top and bottom portions of the folded strap 1205 near the D-rings 1220 are stitched together to keep the D-rings 1220 fixedly attached to the connection part 1200, thereby restraining the D-rings 1220 from any sliding movements along the loop 1210 but retaining pendular motion or movement.

In accordance with an exemplary embodiment of the claimed invention, as exemplary shown FIGS. 5A-B and 10A, the connection part 1200 is a folded strap 1205 forming the loop 1210. At one end of the folded strap 1205, a first D-ring 1220 for attaching a leash (not shown) is fixedly attached to the folded strap 1205. At the other end of the folded strap 1205, a second D-ring 1220 and a connector 1230 is fixedly attached to the folded strap 1205 for removably connecting the two neck ends 1110 of the body part 1100. Preferably, the folded strap 1205 loops around the D-rings 1220, and the top and bottom portions of the folded strap 1205 near the D-rings 1220 are stitched together to fixedly attach the D-rings 1220 to the connection part 1200. The loop 1210 is formed between the two stitched portions of the folded strap 1205 where the two D-rings 1200 are fixedly attached thereto.

In accordance with an aspect of the claimed invention, as exemplary shown in FIGS. 5A-B, the connector 1230 of the connection part 1200 comprises a strap 1232 looped around two flatten oval rings 1231. The strap 1232 of the connector 1230 is inserted into the loop 1210 of the folded strap 1205 such that two flatten oval rings 1231 are outside on the opposite sides of the folded strap 1205. The strap 1232 of the connector 1230 inside the folded strap 1205 is fixedly attached to the folded strap 1205. Preferably, an area of folded strap 1205 overlapping with an area of the strap 1232 of the connector 1230 are stitched together to provide pendular motion to the two flatten oval rings 1231 and fixedly attach the two flatten oval rings 1231 to the connection part 1200.

In accordance with an exemplary embodiment of the claimed invention, as shown in FIGS. 3 and 10A, the harness 1000 comprises two neck connectors 1500 to removably connect the two neck ends 1110 to the connection part 1200. In accordance with an aspect of the claimed invention, each neck connector 1500 is a Velcro® strap 1500 (preferably a Velcro® hook and loop strap 1500) with one end of each Velcro strap 1500 fixedly attached to the respective neck end 1110. Preferably, each Velcro strap 1500 is stitched to the respective neck end 1110 of the harness 1000 to connect the respective neck end 1110 to the connection part 1200. The Velcro hook and loop strap 1500 is a fabric fastener comprised of a soft fuzzy (loop) side and a rougher (hook) side. In accordance with an aspect of the claimed invention, each Velcro hook and loop strap 1500 loops around a respective flatten oval ring 1231 such that the soft fuzzy (loop) side of the Velcro strap 1500 mates with the rougher (hook side) of the Velcro strap 1500 to removably connect the respective neck end 1110 to the connection part 1200.

In accordance with an exemplary embodiment of the claimed invention, as shown in FIGS. 5C-D, 7 and 11A-B, each neck end 1110 is connected to an adjustable strap 1510, preferably made of a durable material including but not limited to nylon. That is, the Velcro strap 1500 at each neck end 1110 in FIG. 3 is replaced with the adjustable strap 1510 in FIG. 7. One end of each adjustable strap 1510 is preferably stitched onto a respective neck end 1110. The other end of each adjustable strap 1510 includes one of the mated connectors 1600 to removably connect the respective neck end 1110 to the connection part 1200 via the other mated connector 1600 on the connection part 1200. That is, as exemplary shown in FIG. 7, the adjustable strap 1510 of each neck end 1110 includes a male connector 1600.

Figure 11B:
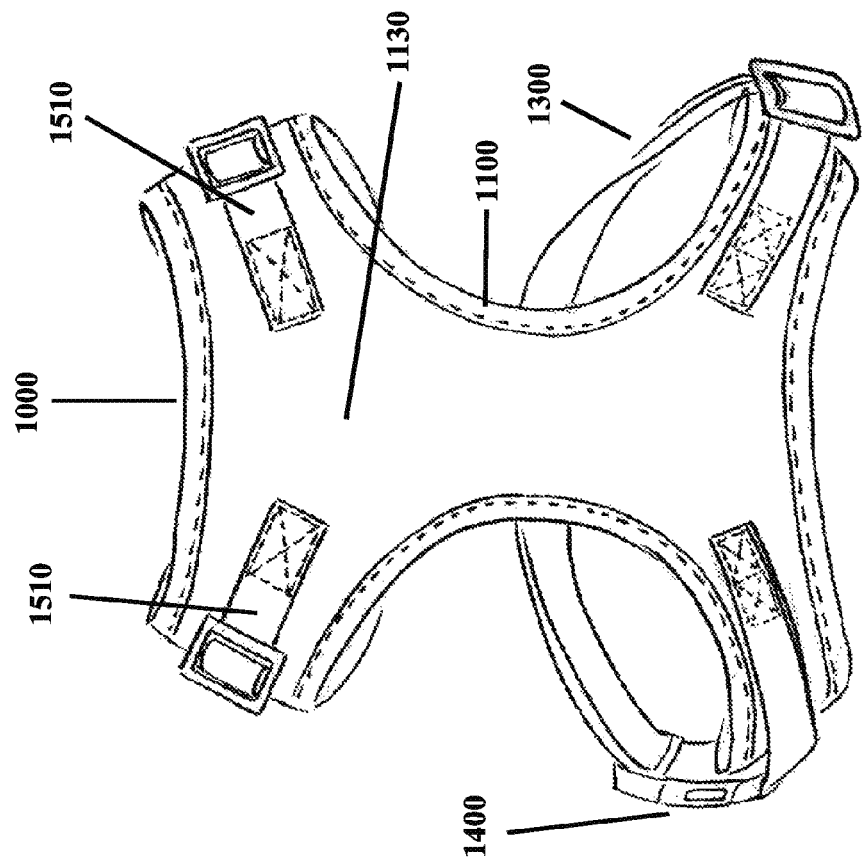
FIGS. 11A-B are front and back perspective views of the non-choking harness of FIGS. 7-8 in a closed position in accordance with an exemplary embodiment of the claimed invention.
Figure 11A:
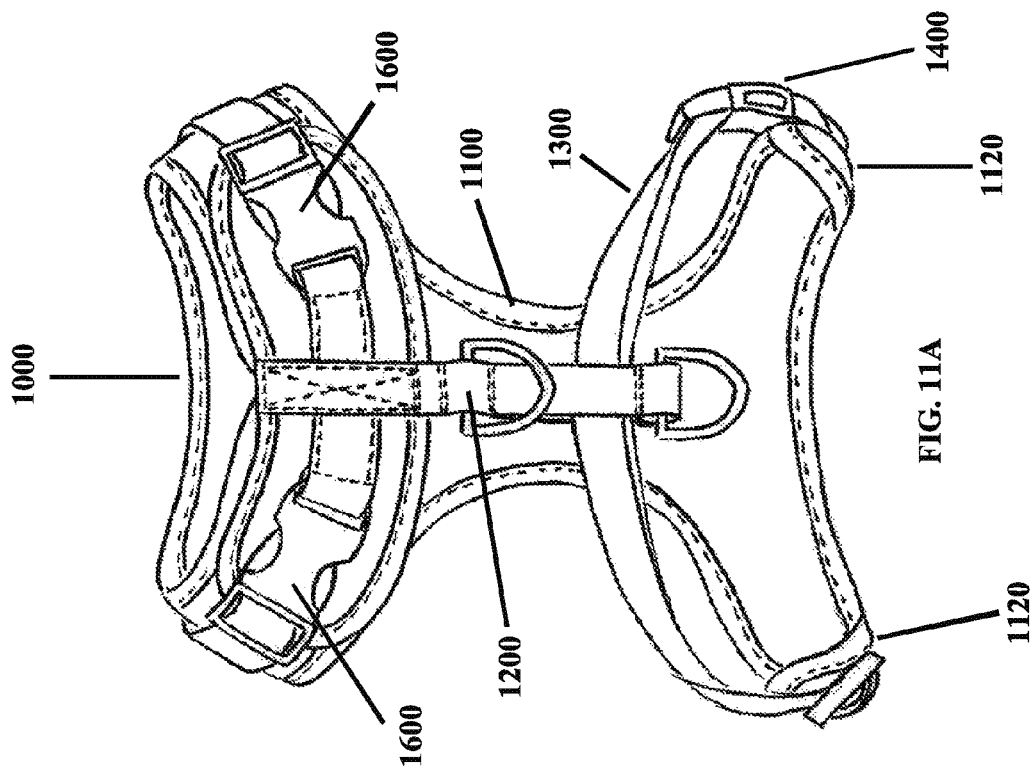

In accordance with an aspect of the claimed invention, as shown in FIGS. 5C-D and 11A, the connector 1230 of the connection part 1200 comprises an arc shaped flap 1233 instead of the strap 1232 looped around two flatten oval rings 1231, as in FIGS. 5A-B. The arc shaped flap 1233 of the connector 1230 is inserted into the loop 1210 of the folded strap 1205 and fixedly attached to the folded strap 1205. Preferably, an area of folded strap 1205 overlapping with an area of the arc shaped flap 1233 of the connector 1230 are stitched together. In accordance with an aspect of the invention, the arc shaped flap 1233 comprises a strap 1234 looped around two connectors 1600 for removably connecting the connector 1230 of the connection part 1200 to the respective neck end 1110 of the body part 1100. The strap 1234 is fixedly attached (preferably, stitched together) to the arc shaped flap 1233 such that each mated connector 1600 is positioned at each end of the arc shaped flap 1233.

Figure 8:
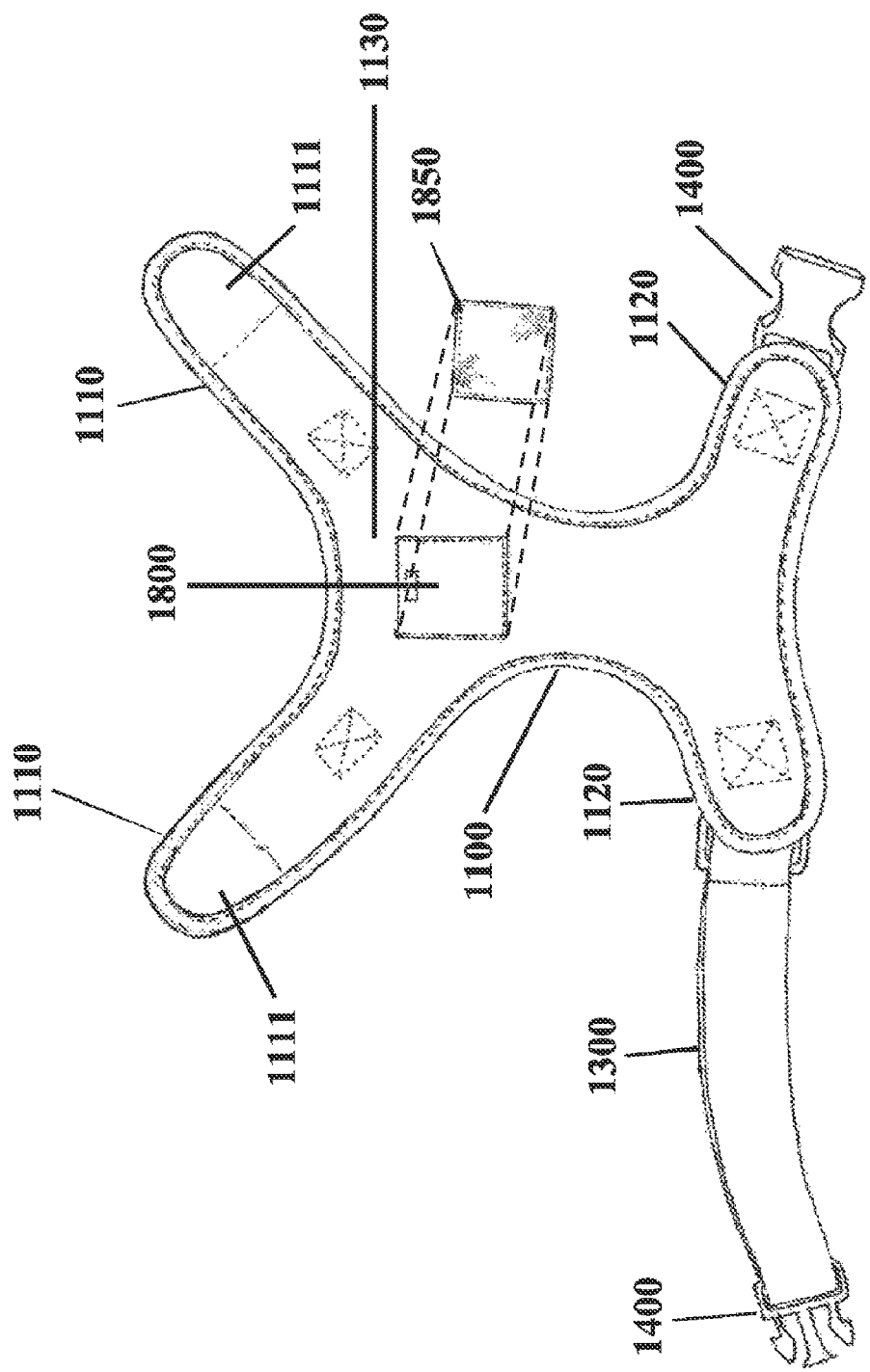

In accordance with an exemplary embodiment of the claimed invention, as shown in FIGS. 5D and 8, the inner surface at each tip of the arc shaped flap 1233 of the connection part 1200 includes a Velcro pad 1235 which mates with a Velcro pad 1111 at the inner surface at the tip of the respective neck end 1110 to removably connect the connection part 1200 to the body part 1100. That is, for example, the fuzzy Velcro pad 1235 of the connector 1230 mates with the rougher Velcro pad 1110 of the respective neck end 1110 to removably connect the connection part 1200 to the body part 1100.

Figure 7:
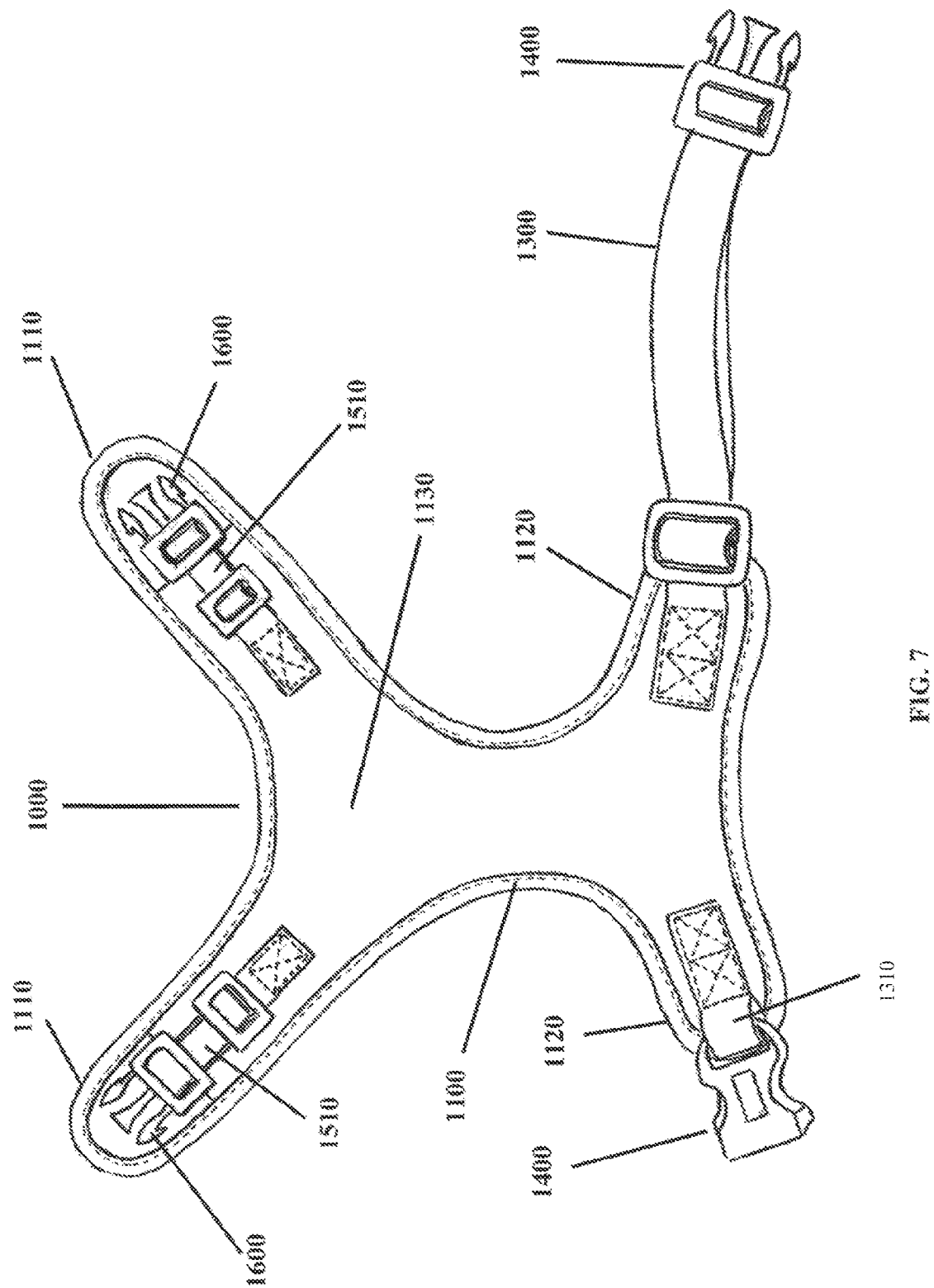
FIGS. 7-8 are top and bottom perspective views of a non-choking harness in an open position in accordance with an exemplary embodiment of the claimed invention.
Figure 12:
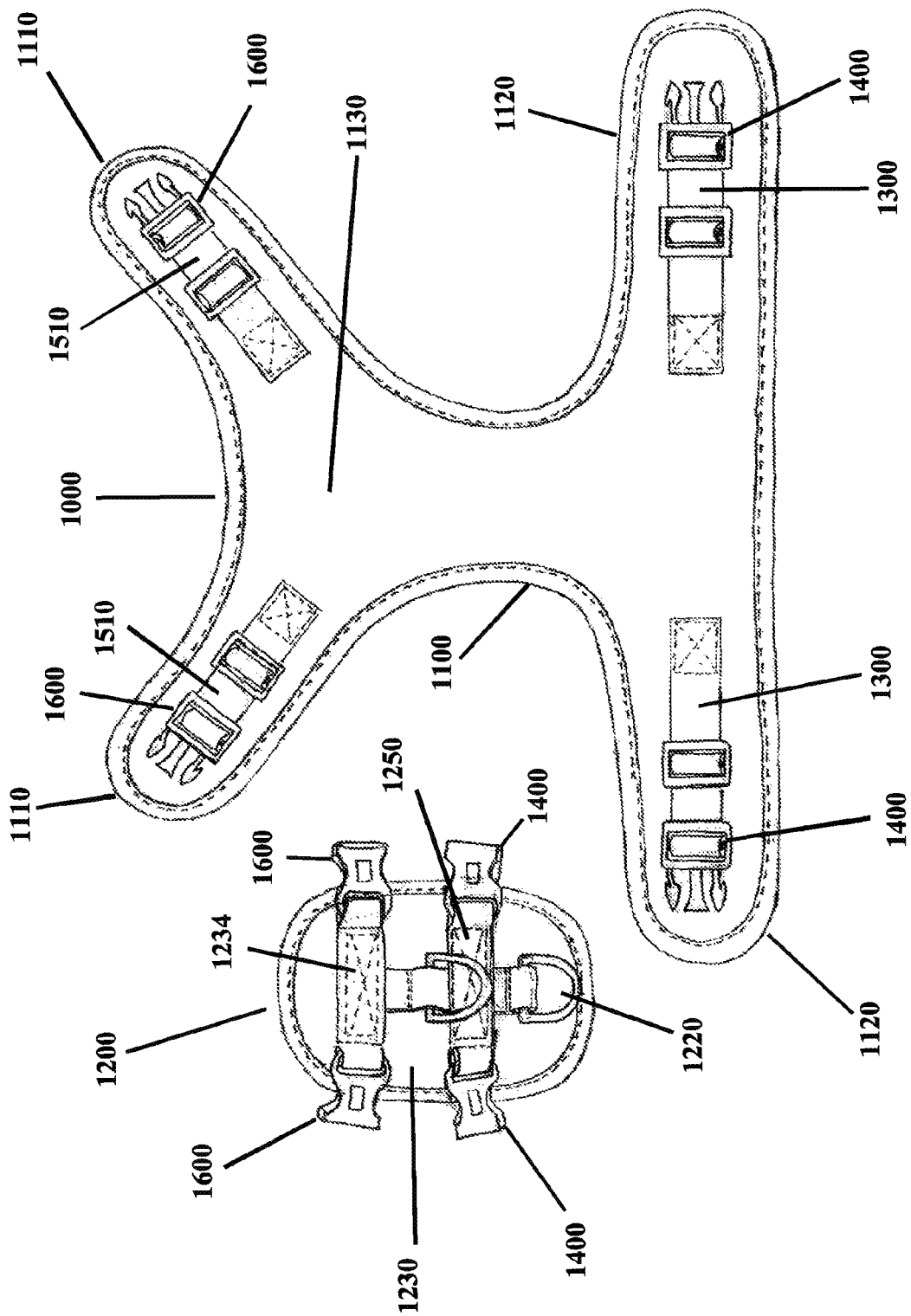
FIGS. 12-13 are top and bottom perspective views of a non-choking harness in an open position in accordance with an exemplary embodiment of the claimed invention.
Figure 13:
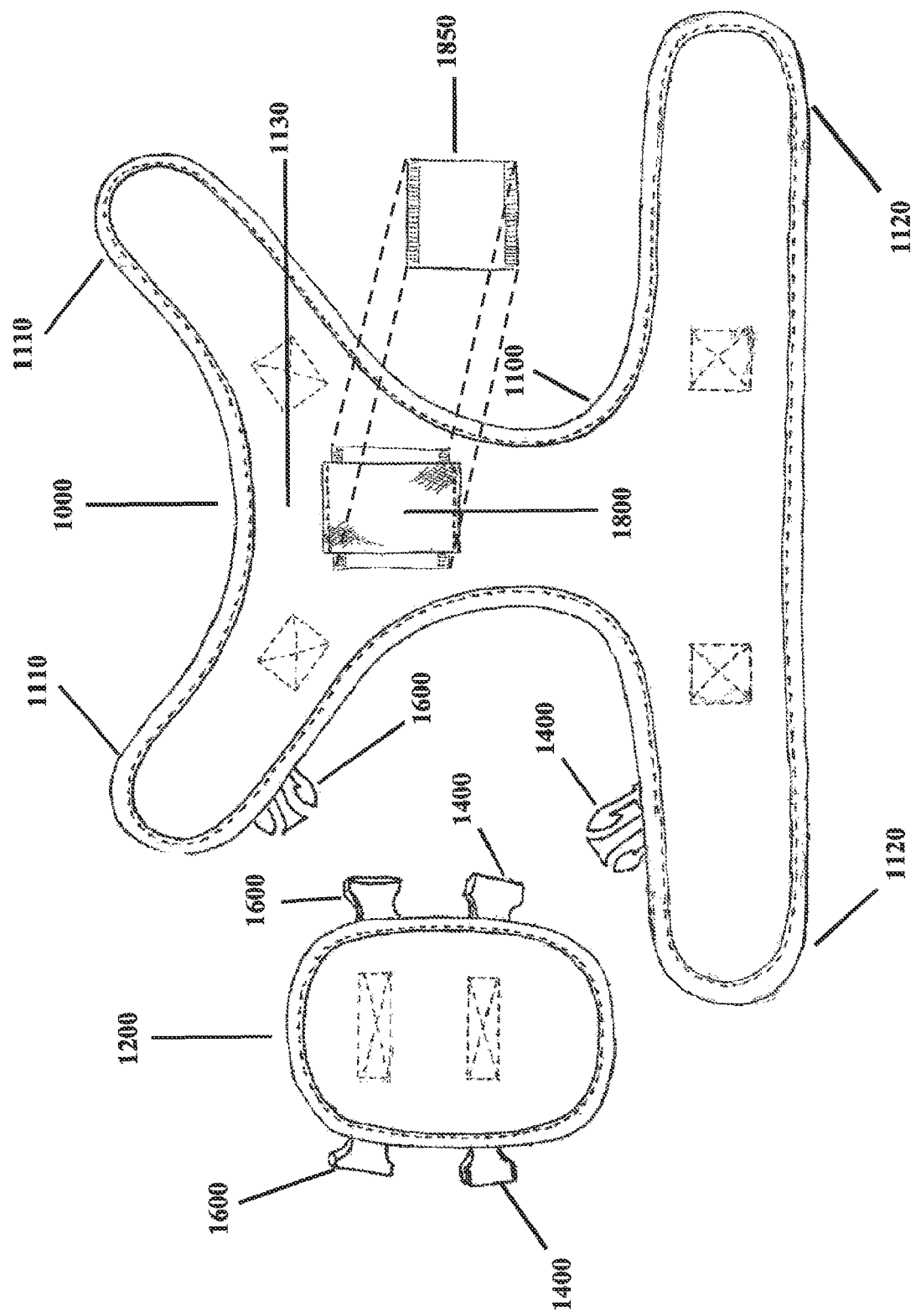
Figures 14A, 14B:
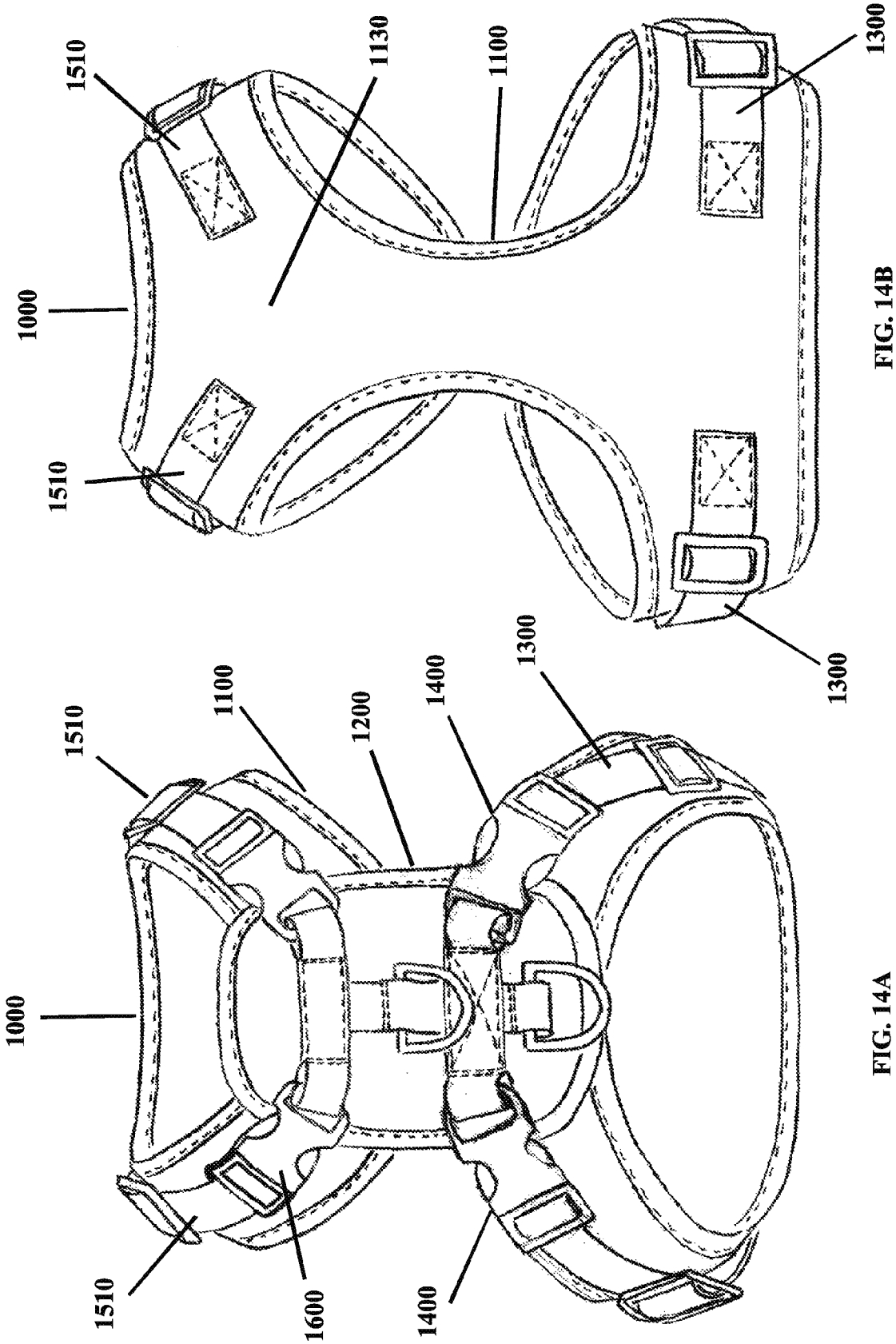
FIGS. 14A-B are front and back perspective views of the non-choking harness of FIGS. 12-13 in a closed position in accordance with an exemplary embodiment of the claimed invention.

In accordance with an exemplary embodiment of the claimed invention, as shown in FIGS. 12, 13 and 14A-B, the connection part 1200 of FIGS. 5C-D is replaced with the connection part of FIGS. 12, 13 and 14A, and the adjustable strap 1300 of FIG. 7 at one torso end 1120 is replaced with two adjustable straps 1300 at each torso end 1120 of the body part 1100. That is, each torso end 1120 has an adjustable strap 1300 including one of the mated connector 1400 to removable connect each torso end 1120 to the connection part 1200. In accordance with an aspect of the claimed invention, the connection part 1200 comprises the folded strap 1205 with two D-rings 1220 fixedly attached to an oval shaped connector 1230. Preferably, the folded strap 1205 is stitched to the oval shaped connector 1230 to provide pendular motion to the D-rings 1220. Also, the connection part 1200 comprises the strap 1234 looped around two connectors 1600 for removably connecting the connection part 1200 to the respective neck end 1110 of the body part 1100. The strap 1234 is fixedly attached (preferably, stitched together) to the oval shaped connector 1230 such that each mated connector 1600 is positioned at the edge of the oval shaped connector 1230. That is, as exemplary shown in FIG. 12, each female connector 1600 of the connection part 1200 removably connects to the male connector 1600 of the respective neck end 1110 to removably connect the connection part 1200 to the body part 1100.

Further, the connection part 1200 comprises a strap 1250 looped around two mated connectors 1400 for removably connecting the connection part 1200 to the torso end 1120 of the body part 1100. The strap 1250 is fixedly attached (preferably, stitched together) to the oval shaped connector 1230 such that each connector 1400 is positioned at the edge of the oval shaped connector 1230. That is, as exemplary shown in FIG. 12, each female connector 1400 of the connection part 1200 removably connects to the male connector 1400 of the respective torso end 1120 to removably connect the connection part 1200 to the body part 1100.

In accordance with an exemplary embodiment of the claimed invention, as shown in FIGS. 4, 8 and 13, the inner surface of the body part 1100 comprises a pouch or opening 1800 to receive an insert or pack 1850. In accordance with an aspect of the claimed invention, the insert 1850 can be infused with various fragrances, such as relaxing aromas, therapeutic aromas, colognes, perfumes, flea protection agents and the like. Alternatively, the insert 1850 can be a hot pack 1850 to warm the pet 200 in the winter and a cool pack 1850 to cool the pet 200 in the summer.

Accordingly, the harness 1000 of the claimed invention is fully adjustable harness. That is, the neck and torso ends of the harness 1000 can be adjusted to provide a tight, comfortable fit, and to accommodate different sized pets, as the pet gains/losses mass, or as the pet grows more hair. Further, unlike the conventional harness, the claimed harness 1000 completely opens up to allow easy accessibility and wearability. That is, the claimed harness 1000 does not need to go over the head of the pet. For an active pet, the pet owner may have difficult time in keeping the pet from moving while trying to fit it into the conventional harness that fits over the head and/or body.

In accordance with an exemplary embodiment of the claimed invention, the D-rings 1220 are attached and fixed to the connection part 1200 to prevent sliding movements without restricting the pendular motion. The sliding D-ring of the U.S. Pat. No. 6,662,755 is still connected to the collar section, thereby potentially choking or putting stress on the pet's neck if the pet suddenly charges forward. Whereas, the claimed harness 1000 comprises two D-rings 1220 fixedly attached to the connection part 1200. The pet owner can attach the leash to the either D-rings. For example, the pet owner can attach the leash to the top D-ring 1220 (one near the neck end 1100 of the harness 1000) for non-aggressive pet that do not pull when walked or to the bottom D-ring 1220 (one near the torso end 1120 of the harness 1000) for aggressive pet that may charge forward and may have to be contained by pulling the leash back. Unlike the conventional harness, when the leash connected to the bottom D-ring 1220 of the claimed harness 1000 is pulled by the pet owner to contain the aggressive pet, the stress is not put on the pet's neck but distributed throughout the chest area of the pet. This advantageously minimizes or eliminates any choking hazard on the pet's neck.

The invention, having been described, it will be apparent to those skilled in the art that the same may be varied in many ways without departing from the spirit and scope of the invention. Any and all such modifications are intended to be included within the scope of the following claims.

I claim:

1. A non-choking harness for a pet, comprising:
a body part comprising a center portion to substantially cover a chest area of the pet, two neck ends configured to wrap around a neck of the pet to provide a neck opening and two torso ends configured to wrap around a torso of the pet to provide a torso opening;
an adjustable strap fixedly attached to a first torso end to removably connect the first torso end to a second torso end, and to adjust a size of the torso opening;
a connection part comprising a folded strap with first and second flattened oval rings proximate to one end of the folded strap, the connection part configured to removably connect to the two neck ends and to adjust a size of the neck opening, such that the non-choking harness completely opens up for easy access in fitting the pet;
at least one D-ring fixedly attached to the connection part to attach a leash;
a first hook and loop strap fixedly attached to a first neck end and looping around the first flattened oval ring such that a hook portion of the first hook and loop strap mates with a loop portion of the first hook and loop strap to removably connect the first neck end to the connection part;
a second hook and loop strap fixedly attached to a second neck end and looping around the second flattened oval ring such that a hook portion of the second hook and loop strap mates with a loop portion of the second hook and loop strap to removably connect the second neck end to the connection part; and
wherein the center portion of the body part evenly distributes stress throughout the chest area of the pet and away from the neck area of the pet when the leash is pulled to prevent choking of the pet.

2. The non-choking harness of claim 1, wherein the folded strap of the connection part comprises a loop proximate to another end of the folded strap to removably receive the adjustable strap which is moveable along the loop to provide a tight fit when worn by the pet.

3. The non-choking harness of claim 2, further comprising a pair of mated connectors, a first mated connector fixedly attached to the second torso end and a second mated connector fixedly attached to one end of the adjustable strap; and wherein another end of the adjustable strap is fixedly attached to the first torso end.

4. The non-choking harness of claim 1, wherein the body part is made of sturdy, elastic mesh-like polyester material to provide a lightweight, breathable and comfortable harness.

5. The non-choking harness of claim 4, wherein the mesh-like polyester material comprises an outer layer, an inner layer and an internal layer between the outer and inner layers.

6. The non-choking harness of claim 5, wherein the internal layer is infused with one or more of the following fragrances: relaxing aroma, therapeutic aroma, cologne, perfume and flea protection agent.

7. The non-choking harness of claim 1, further comprising a pouch on an inner surface of the center portion of the body part to receive a cool pack to cool the pet or a hot pack to warm the pet.

8. The non-choking harness of claim 1, further comprising a pouch on an inner surface of the center portion of the body part to receive a pack that is infused with one or more of the following fragrances: relaxing aroma, therapeutic aroma, cologne, perfume and flea protection agent.

9. The non-choking harness of claim 1, wherein said at least one D-ring is fixedly attached to the connection part to retain pendular motion but inhibit sliding movements.

\* \* \* \* \*